(12) United States Patent  
Neumetzler et al.

(10) Patent No.: US 8,192,235 B2
(45) Date of Patent: *Jun. 5, 2012

(54) CABLE CONNECTOR FOR PRINTED CIRCUIT BOARDS

(75) Inventors: Heiko Neumetzler, Berlin (DE); Harald Klein, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/978,067

(22) Filed: Dec. 23, 2010

(65) Prior Publication Data

US 2011/0092099 A1   Apr. 21, 2011

Related U.S. Application Data

(63) Continuation of application No. 11/722,647, filed as application No. PCT/EP2005/011767 on Nov. 3, 2005, now Pat. No. 7,883,374.

(30) Foreign Application Priority Data

Dec. 22, 2004  (DE) .......................... 10 2004 061 681

(51) Int. Cl.
    *H01R 13/66* (2006.01)
(52) U.S. Cl. .................................. 439/620.21
(58) Field of Classification Search ............ 439/620.21, 439/79–80, 932, 922, 716; 361/118–119
    See application file for complete search history.

(56) References Cited

U.S. PATENT DOCUMENTS

| | | |
|---|---|---|
| 4,281,885 A | 8/1981 | Forberg et al. |
| 4,345,294 A | 8/1982 | Forberg et al. |
| 4,882,748 A | 11/1989 | Meyerhoefer |
| 4,986,768 A | 1/1991 | Bramkamp et al. |
| 5,086,368 A | 2/1992 | Gerket et al. |
| 5,155,649 A | 10/1992 | Hung et al. |
| 5,155,650 A | 10/1992 | Pitsch et al. |
| 5,187,634 A | 2/1993 | Pitsch et al. |
| 5,357,568 A | 10/1994 | Pelegris |
| 5,369,543 A | 11/1994 | Bonnesen et al. |
| 5,371,648 A | 12/1994 | Bonvallat |
| 5,546,267 A | 8/1996 | Frederiksen et al. |
| 5,555,153 A | 9/1996 | Frederiksen et al. |
| 5,574,614 A | 11/1996 | Busse et al. |
| 5,574,615 A | 11/1996 | Busse et al. |
| 5,627,721 A | 5/1997 | Figueiredo et al. |

(Continued)

FOREIGN PATENT DOCUMENTS

AU   748833   11/1999

(Continued)

*Primary Examiner* — Jean F Duverne
(74) *Attorney, Agent, or Firm* — Merchant & Gould P.C.

(57) ABSTRACT

A cable connector (1) for printed circuit boards includes a housing (2, 3) and at least two contact elements (4). Each contact element includes a contact (11) for connecting electrical wires and a fork contact (6, 7) for making contact with a printed circuit board. A surge arrester (17) is arranged within the housing (2, 3) and is arranged electrically between the contact elements (4).

14 Claims, 2 Drawing Sheets

U.S. PATENT DOCUMENTS

| | | |
|---|---|---|
| 5,910,877 A | 6/1999 | Paske et al. |
| 5,923,238 A | 7/1999 | Polzehl et al. |
| 5,936,821 A | 8/1999 | Busse et al. |
| 5,999,412 A | 12/1999 | Busse et al. |
| 6,511,327 B1 | 1/2003 | Kerr et al. |
| 6,654,223 B1 | 11/2003 | Bippus |
| 7,270,551 B2 | 9/2007 | Busse et al. |
| 7,583,488 B2 | 9/2009 | Neumetzler et al. |
| 7,883,374 B2 * | 2/2011 | Neumetzler et al. ..... 439/620.21 |
| 8,064,182 B2 | 11/2011 | Baker et al. |
| 2004/0246644 A1 | 12/2004 | Sato et al. |
| 2007/0064373 A1 | 3/2007 | Neumetzler et al. |
| 2008/0204963 A1 | 8/2008 | Baker |
| 2009/0296303 A1 | 12/2009 | Petersen |

FOREIGN PATENT DOCUMENTS

| | | |
|---|---|---|
| AU | 762700 | 12/2000 |
| DE | 198 16 907 A1 | 10/1999 |
| DE | 201 13 817 U1 | 12/2001 |
| DE | 100 29 649 A1 | 1/2002 |
| DE | 101 59 879 A1 | 10/2002 |
| DE | 102 57 308 B3 | 7/2004 |
| DE | 103 17 621 A1 | 11/2004 |
| WO | WO 01 97339 A1 | 5/2001 |

* cited by examiner

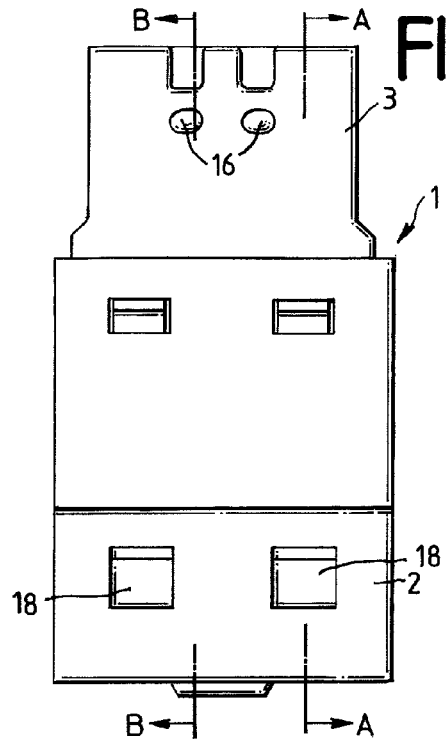
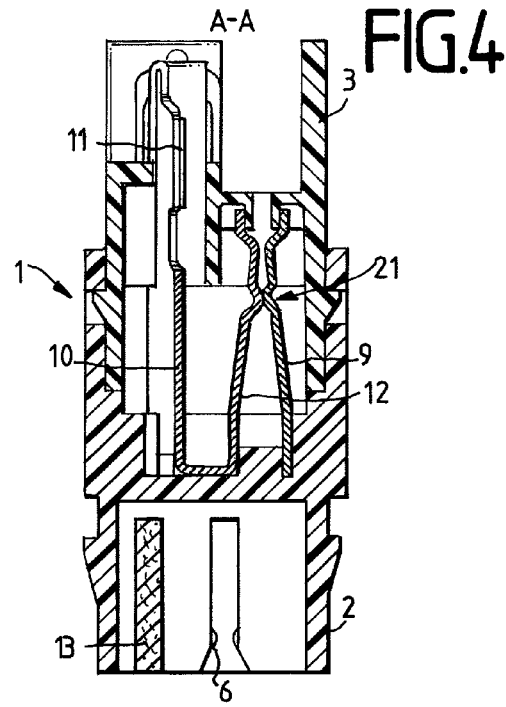
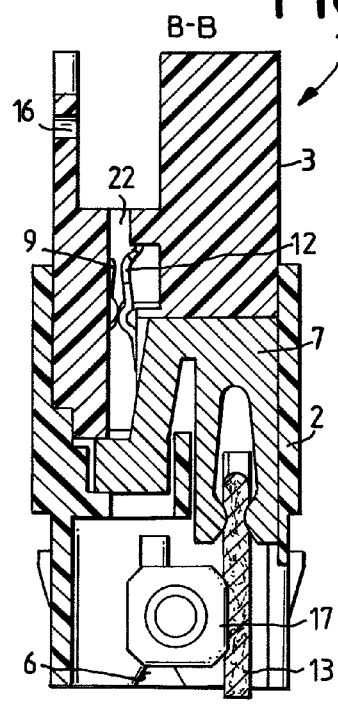
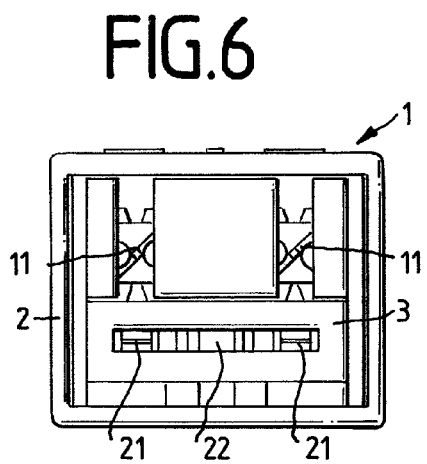

CABLE CONNECTOR FOR PRINTED CIRCUIT BOARDS

This application is a Continuation of U.S. Ser. No. 11/722,647, filed 5 May 2008, now U.S. Pat. No. 7,883,374, which is a National Stage Application of PCT/EP2005/011767, filed 3 Nov. 2005, which claims benefit of Serial No. 10 2004 061 681.7, filed 22 Dec. 2004 in Germany and which applications are incorporated herein by reference. To the extent appropriate, a claim of priority is made to each of the above disclosed applications.

BACKGROUND

DE 102 57 308 B3 has disclosed a connector for printed circuit boards, comprising a number of contact elements, the contact elements each having two connection sides, one connection side being in the form of an insulation displacement contact for connecting wires and the other connection side being in the form of a fork contact for making contact with connection areas on a printed circuit board, and a plastic housing in which the insulation displacement contacts of the contact elements can be inserted, the insulation displacement contact and the fork contact being arranged such that they are rotated towards one another, and at least one lower edge of the insulation displacement contact being supported on the plastic housing such that the contact elements are held in the plastic housing such that they are secured against falling out in the event of connection forces occurring on the insulation displacement contacts, the plastic housing comprising at least one region in the form of a chamber, and the fork contacts being completely accommodated in the longitudinal direction by the plastic housing, ribs being arranged on the inner sides in the region in the form of a chamber and defining the guides for the fork contacts, the contact regions of the fork contacts protruding beyond the ribs, and the ribs being beveled in the front region.

Such cable connectors serve the purpose, for example, together with a housing part which bears the printed circuit board, of forming a distribution board connection module, which has also already been described in DE 102 57 308 B3.

Such a distribution board connection module is also already known from DE 100 29 649 A1, comprising a housing in which input and output contacts are arranged such that they are accessible from the outside for connecting lines and wires, the housing being formed with a cavity in which functional elements are arranged between the input and output contacts. The functional elements are arranged on at least one printed circuit board which is supported in the housing, the functional elements providing, for example, overvoltage protection. In addition, the functional elements may also be filter circuits such as XDSL splitters.

The arrangement of the filter circuit on the same printed circuit board as the surge arresters has a few disadvantages, however. In addition to the increased production complexity in terms of population, in particular the number of contact points required for the line path is increased. However, the reliability of the distribution board connection module is thus decreased in particular if these contact points need to withstand high current loads. In addition, owing to the placement of the surge arresters on the main board, the physical area available there for the filter circuits is decreased. Furthermore, surge arresters usually require greater copper thicknesses, which is likewise reflected in the costs and space requirement. Such main boards are generally designed for a plurality of subscribers and are arranged in stacked fashion in rack systems. Furthermore, the complete main board needs to be removed in order to replace a defective surge arrester. In this case, subscribers which are not involved would also be interrupted and adversely affected. As an alternative, the surge arresters could also be plugged onto the cable connector from above, in this case, however, the contacts no longer being freely accessible for jumpering.

SUMMARY

The invention is based on the technical problem of providing a cable connector by means of which overvoltage protection of the wires or lines to be connected can be implemented in a simple and cost-effective manner.

For this purpose, a surge arrester which is arranged within the housing is arranged electrically between the contact elements. This brings about a number of advantages. Firstly, a main board can now be used more effectively in terms of space. Secondly, the overvoltage protection takes place even before the main board and overvoltages can be dissipated directly at the point of entry. In particular, in embodiments having only two contact elements per subscriber, the cable connector may be withdrawn in the case of defective surge arresters and the defective surge arrester or the cable connector as a whole can be replaced without the other subscribers being disrupted. In an embodiment having four contact elements, only one other subscriber would be disrupted.

In one preferred embodiment, the surge arrester is connected to the contact elements such that it can be detached. This means that, in the event of there being a defect in the surge arrester, only this surge arrester need be replaced and not the complete cable connector. Furthermore, this also has advantages as regards ease of recycling.

In order to arrange the surge arrester such that it can be detached, in each case a further fork contact is preferably arranged on the contact elements. The shape of the fork contacts is in this case preferably matched to the shape of the contacts of the surge arrester.

In a further, preferred embodiment, the fork contacts for the printed circuit board (main board) and the surge arresters are aligned parallel to one another, the fork contact for the printed circuit board (main board) being arranged in the region of the side walls of the housing, and the fork contact for the surge arrester being moved laterally inwards. This makes optimum use of the physical space for the cable connector, since the surge arrester is positioned between the fork contacts for the printed circuit board (main board). The fork contact for the printed circuit board preferably protrudes up to the lower edge of the housing such that it is largely guided in the housing.

In a further, preferred embodiment, the fork contact for the surge arrester is moved back into the housing and/or is displaced parallel to the fork contact such that the surge arrester with which contact has been made does not hinder the insertion process on the printed circuit board.

In a further, preferred embodiment, the surge arrester is arranged on a separate printed circuit board, which significantly simplifies in particular the replacement process.

In a further, preferred embodiment, fine protection elements such as PTC resistors and diodes are arranged on the printed circuit board (main board).

In a further, preferred embodiment, the housing of the cable connector is of two-part design.

In a further, preferred embodiment, the contact elements are of two-part design, one contact part comprising the contact for connecting the wires and the other contact part comprising the fork contact for the printed circuit board (main board), each contact part comprising a resilient contact arm which together form an isolating contact.

BRIEF DESCRIPTION OF THE DRAWINGS

The invention will be explained in more detail below with reference to a preferred exemplary embodiment. In the figures:

FIG. 3 shows a side view of the cable connector with an upper and a lower housing part, FIG. 4 shows a cross section along the section A-A, FIG. 5 shows a cross section along the section B-B, and FIG. 6 shows a plan view of the cable connector.

DETAILED DESCRIPTION

Figure 1:
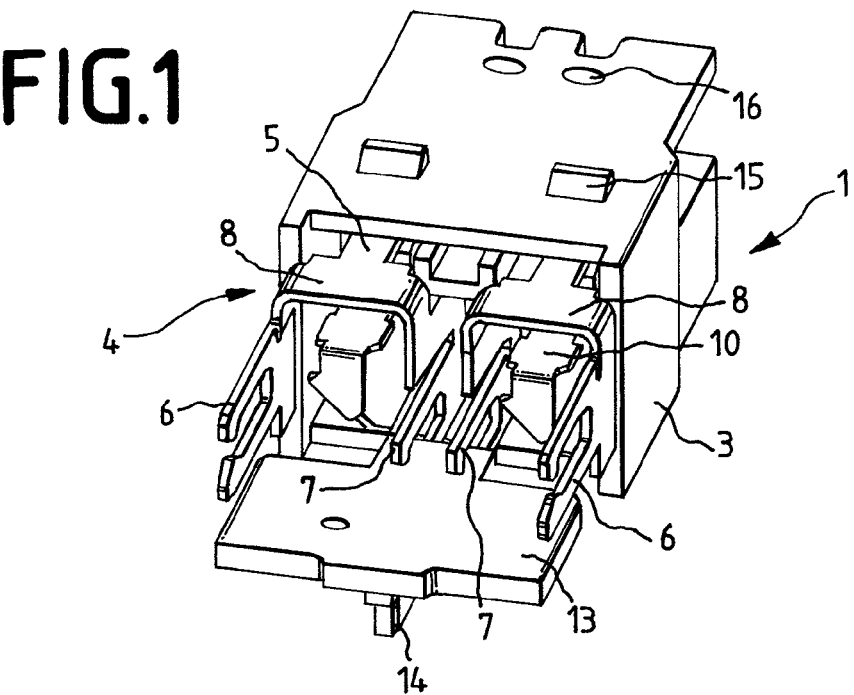
FIG. 1 shows a perspective view from below of the cable connector without a lower housing part.
Figure 2:
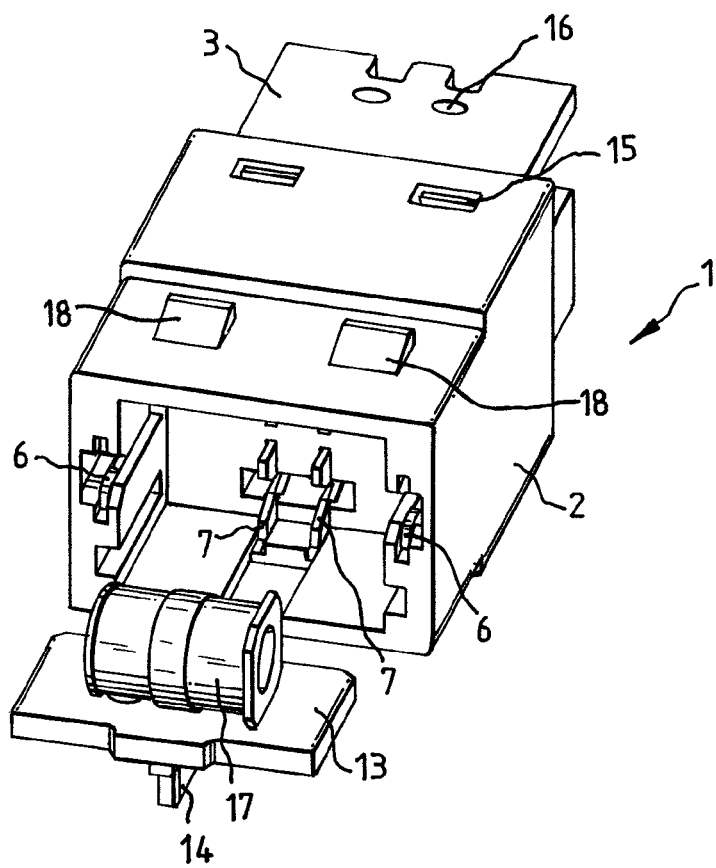
FIG. 2 shows a perspective view from below of the cable connector with a lower housing part.

FIG. 1 shows a perspective lower view of the cable connector 1 without a lower housing part 2 (see FIG. 2). The cable connector 1 comprises an upper housing part 3, in which contact elements 4 can be inserted from below which are guided through corresponding guides in the housing part 3. The contact elements 4 are of two-part design, a first contact part 5 comprising two fork contacts 6, 7 which are connected to one another via a U-shaped bend 8. In addition, a resilient contact arm 9 (which can be seen particularly well in FIG. 4) branches off upwards from the U-shaped bend. The second contact part 10 comprises an insulation displacement contact 11 (see FIG. 4) and a further resilient contact arm 12. The two resilient contact arms 9, 12 then form an isolating contact (see FIG. 4). The two fork contacts 6, 7 are in this case aligned parallel to one another, the fork contact 7 however being moved upwards (in the direction of the upper housing part 3) and displaced parallel (away from the U-shaped bend 8). Furthermore, the cable connector 1 comprises a printed circuit board 13 on which a surge arrester 17 is arranged (see FIG. 2). Contact is in this case made with the printed circuit board 13 via the two fork contacts 7. However, in this case the fork contacts 6 remain freely accessible owing to the moved arrangement of the fork contacts 7 such that contact can be made with a further printed circuit board having functional elements (main board) via said fork contacts 6. The printed circuit board 13 also has a ground contact 14, by means of which a ground connection, for example via a mounting rack, can be produced. The upper housing part 3 is formed on the side faces with latching lugs 15 which serve the purpose of latching with the lower housing part 2, as is illustrated in FIG. 2. The housing part 3 also has latching openings 16 which serve the purpose of accommodating latching knobs of a plug (not illustrated). The lower housing part 2 likewise has latching lugs 18, by means of which the cable connector 1 can be latched with a further housing (not illustrated) which bears the main board.

FIG. 3 shows a side view of the cable connector 1, the cross sections along the section lines A-A and B-B being illustrated in FIGS. 4 and 5, respectively. FIG. 4 illustrates how the second contact part 10 is supported on a bearing 20 of the lower housing part 2, as a result of which the connection forces occurring are absorbed by the housing. It is also illustrated how the two resilient contact arms 9, 12 form an isolating contact 21. Provided in the upper housing part 3 is an insertion channel 22, in which an isolating plug or test plug (not illustrated) can be inserted which can be used to isolate the isolating contact 21. If the isolating plug or test plug is withdrawn again, the two contact arms 9, 12 spring back again and make contact with one another.

FIG. 6 shows a plan view of the cable connector 1 such that, in particular, the elongated insertion channel 22 can be seen as well as the rotation of the insulation displacement contacts 11 through 45° towards the fork contacts 6, 7.

LIST OF REFERENCE NUMERALS

1 Cable connector
2 Housing part
3 Housing part
4 Contact element
5 Contact part
6 Fork contact
7 Fork contact
8 U-shaped bend
9 Contact arm
10 Contact part
11 Insulation displacement contact
12 Contact arm
13 Printed circuit board
14 Ground contact
15 Latching lug
16 Latching opening
17 Surge arrester
18 Latching lug
20 Bearing
21 Isolating contact
22 Insertion channel

The invention claimed is:

1. A cable connector for printed circuit boards, comprising:
a housing;
at least two contact elements, each contact element including a first contact, a second contact, and a third contact, wherein the first contact and the second contact of each contact element are accessible from an exterior of the housing; and
a surge arrester connected to the third contacts of the contact elements, the surge arrester being arranged electrically between the contact elements.

2. The cable connector as claimed in claim 1, wherein the surge arrester is detachably connected to the third contacts of the contact elements.

3. The cable connector as claimed in claim 2, wherein the third contact of each contact element is a fork contact.

4. The cable connector as claimed in claim 3, wherein the fork contacts are positioned laterally inwards from the second contacts of the contact elements.

5. The cable connector as claimed in claim 1, wherein the surge arrester is arranged on a printed circuit board.

6. The cable connector as claimed in claim 1, wherein the housing is of two-part design.

7. The cable connector as claimed in claim 1, wherein the contact elements are of two-part design, one contact part defining the first contact and the other contact part defining the second and third contacts, each contact part including a resilient contact arm, wherein the contact arms of the contact parts of each contact element cooperate to form an isolating contact.

8. A cable connector for printed circuit boards, comprising:
a housing having a first end and a second end;
first and second contacts located at the first end of the housing;
first and second outer contacts located on opposite sides of the second end of the housing;
first and second inner contacts located at the second end of the housing spaced inwardly from the first and second outer contacts, the inner contacts being displaced parallel from the outer contacts;

a surge arrester connected to the inner contacts so that the surge arrester is arranged electrically between the inner contacts.

9. The cable connector as claimed in claim 8, wherein the surge arrester is positioned on a printed circuit board that is mounted between the inner contacts.

10. The cable connector as claimed in claim 8, wherein the surge arrester is detachably connected to the inner contacts.

11. The cable connector as claimed in claim 8, wherein the housing is of two-part design.

12. The cable connector as claimed in claim 8, wherein the first outer contact and first inner contact are integrally formed and wherein the second outer contact and second inner contact are integrally formed.

13. The cable connector as claimed in claim 8, wherein the first contact includes a resilient arm that cooperates with a resilient arm of the first outer contact to form a first isolating contact.

14. The cable connector as claimed in claim 8, wherein the outer contacts define outer fork contacts that are configured to connect to another printed circuit board.

* * * * *